(12) United States Patent
Yamanaka

(10) Patent No.: US 12,313,931 B2
(45) Date of Patent: May 27, 2025

(54) DISPLAY DEVICE

(71) Applicant: Sharp Display Technology Corporation, Kameyama (JP)

(72) Inventor: Shigetsugu Yamanaka, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/293,353

(22) PCT Filed: Sep. 2, 2021

(86) PCT No.: PCT/JP2021/032290
§ 371 (c)(1),
(2) Date: Jan. 29, 2024

(87) PCT Pub. No.: WO2023/032122
PCT Pub. Date: Mar. 9, 2023

(65) Prior Publication Data
US 2024/0337875 A1    Oct. 10, 2024

(51) Int. Cl.
*G02F 1/1335*  (2006.01)
*G02F 1/1343*  (2006.01)

(52) U.S. Cl.
CPC .. *G02F 1/133512* (2013.01); *G02F 1/134309* (2013.01); *G02F 1/13439* (2013.01)

(58) Field of Classification Search
None
See application file for complete search history.

(56) References Cited

U.S. PATENT DOCUMENTS

| | | |
|---|---|---|
| 2017/0220840 A1 | 8/2017 | Wickboldt et al. |
| 2017/0220844 A1 | 8/2017 | Jones et al. |
| 2018/0089491 A1* | 3/2018 | Kim ................. G02B 6/0088 |
| 2019/0266376 A1* | 8/2019 | He ................ G02F 1/13318 |
| 2020/0066809 A1* | 2/2020 | Liu ..................... H10K 59/352 |
| 2020/0200596 A1* | 6/2020 | Shepelev ............... G09G 3/20 |
| 2020/0279090 A1 | 9/2020 | He et al. |
| 2021/0151511 A1* | 5/2021 | Kim ..................... H10K 59/65 |
| 2021/0184155 A1* | 6/2021 | Chae .................. H10K 59/122 |
| 2021/0342566 A1 | 11/2021 | Ishibe |
| 2022/0302228 A1* | 9/2022 | Choi ................... H10K 59/121 |

FOREIGN PATENT DOCUMENTS

| | | |
|---|---|---|
| JP | 2019-512762 A | 5/2019 |
| JP | 2020-035327 A | 3/2020 |

\* cited by examiner

*Primary Examiner* — Shan Liu
(74) *Attorney, Agent, or Firm* — ScienBiziP, P.C.

(57) ABSTRACT

A display device according to the disclosure includes an imaging layer including imaging pixels, a light guide layer positioned as a layer above the imaging layer and including light guide elements guiding light incident from above to the imaging pixels positioned below, and a display layer positioned as a layer above the light guide layer and including pixel circuits and pixel electrodes.

11 Claims, 16 Drawing Sheets

DISPLAY DEVICE

The disclosure relates to a display device.

BACKGROUND ART

A display device in which an imaging unit is provided behind a display surface has been developed.

JP 2019-512762 T discloses a configuration in which a plurality of display elements configured to emit light to provide display, an aperture layer arranged below the plurality of display elements, a collimator layer arranged below the aperture layer, and a plurality of light detection elements arranged below the collimator layer are included.

SUMMARY

Technical Problem

A plurality of wiring lines and a plurality of electrodes are provided in the display layer in which the plurality of display elements of JP 2019-512762 T are provided. For example, common electrodes, pixel electrodes, electrodes of transistors, wiring lines between the pixel electrodes and the transistors, source signal lines, gate signal lines, and power lines are provided. Most or all of the wiring lines and electrodes are made of light-blocking conductors. Light is diffracted according to its own wavelength by the light-blocking wiring lines and the electrodes, and causes an interference pattern to be generated.

A captured image on which such an interference pattern is superimposed includes bleeding and periodic noise, which lowers the quality.

An object of an aspect of the disclosure is to improve the quality of captured images of a display device in which an imaging unit is provided behind a display surface.

Solution to Problem

A display device according to the disclosure includes a first layer including an imaging element, a second layer positioned as a layer above the first layer and including a light guide element configured to guide light incident from above to the imaging element positioned below, and a third layer positioned as a layer above the second layer and including a pixel electrode and a pixel circuit connected to the pixel electrode to control a potential of the pixel electrode.

In the display device according to the disclosure, the pixel electrode may be a reflective electrode that reflects light.

In the display device according to the disclosure, the pixel circuit may include a wiring line or an electrode that reflects or absorbs light.

In the display device according to the disclosure, an upper surface of the second layer may be in contact with the third layer.

In the display device according to the disclosure, the third layer may include a first area and a second area in each of which a plurality of the pixel circuits and a plurality of the pixel electrodes are arranged, a density of the plurality of the pixel circuits in the first area may be lower than a density of the plurality of the pixel circuits in the second area, and the imaging element and the light guide element may be arranged to overlap the first area in a plan view taken from above.

In the display device according to the disclosure, the light guide element may be arranged at a position not overlapping the plurality of the pixel circuits and the plurality of the pixel electrodes in the first area in a plan view taken from above.

In the display device according to the disclosure, a plurality of the light guide elements may be provided, and the second layer may further include a boundary portion being arranged between the plurality of the light guide elements, and absorbing or reflecting light incident from the plurality of the light guide elements.

In the display device according to the disclosure, the boundary portion may be made from a transparent material having a higher refractive index than a refractive index of each of the plurality of the light guide elements or a light-blocking material absorbing or reflecting light.

In the display device according to the disclosure, the third layer may further include a plurality of wiring lines configured to absorb or reflect light, and the plurality of wiring lines in the first area overlap the boundary portion.

In the display device according to the disclosure, the third layer may further include a plurality of wiring lines that absorb or reflect light, and the boundary portion may overlap at least a part of the plurality of wiring lines in the first area.

In the display device according to the disclosure, the boundary portion may overlap all of the plurality of wiring lines in the first area.

In the display device according to the disclosure, an interval between two adjacent pixel circuits of the plurality of the pixel circuits in the first area may be larger than 10 times a diameter of each of the plurality of the light guide elements arranged between the two adjacent pixel circuits in a plan view taken from above.

In the display device according to the disclosure, the second layer may further include a light-blocking area, and the light-blocking area may be arranged at a position overlapping the plurality of the pixel circuits and the plurality of the pixel electrodes in the first area in a plan view taken from above, and may absorb or reflect light incident from above.

In the display device according to the disclosure, the light-blocking area may be arranged at a position overlapping all of the plurality of the pixel circuits and all of the plurality of the pixel electrodes in the first area in a plan view taken from above.

In the display device according to the disclosure, the light-blocking area may be arranged at a position overlapping the second area in a plan view taken from above.

In the display device according to the disclosure, the light-blocking area may be made from a light-blocking material that absorbs or reflects light.

In the display device according to the disclosure, the boundary portion may be made from the same light-blocking material as that of the light-blocking area.

In the display device according to the disclosure, the boundary portion may be made from a transparent material having a higher refractive index than that of each of the plurality of the light guide elements, and the light-blocking area may be formed by covering an upper surface of the transparent material with the light-blocking material.

In the display device according to the disclosure, the boundary portion may further be arranged between the light-blocking areas and the light guide elements.

In the display device according to the disclosure, a plurality of the light-blocking areas may be provided, and only one of the plurality of the light guide elements may be provided between two adjacent light-blocking areas.

In the display device according to the disclosure, a plurality of the light-blocking areas may be provided, and two or more of the plurality of the light guide elements may be provided between two adjacent light-blocking areas.

In the display device according to the disclosure, the light-blocking area may be arrayed in accordance with the same array pattern as that of the plurality of the pixel circuits.

In the display device according to the disclosure, the light-blocking area may be arrayed in accordance with the same array pattern as that of the imaging elements.

In the display device according to the disclosure, the third layer may further include a self-light-emitting element including the pixel electrode, a common electrode, and an electro-luminescent layer between the pixel electrode and the common electrode.

In the display device according to the disclosure, the third layer may further include a liquid crystal layer.

In the display device according to the disclosure, the first layer may further include a camera provided with a plurality of the imaging elements or an image sensor provided with a plurality of the imaging elements.

Advantageous Effects of Disclosure

According to an aspect of the disclosure, the quality of captured images can be improved.

DESCRIPTION OF EMBODIMENTS

First Embodiment

Planar Configuration of Display Device

Figure 1:
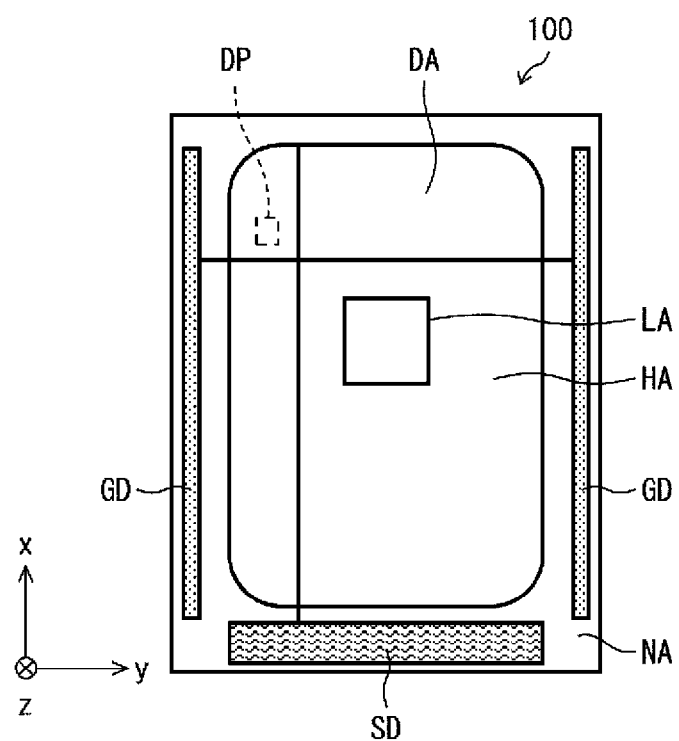
FIG. 1 is a plan view illustrating an example of a schematic configuration of a display device according to an embodiment of the disclosure.

FIG. 1 is a plan view illustrating an example of a schematic configuration of a display device 100 according to a first embodiment.

The display device 100 includes a display area DA in which display pixels DP are provided and a frame area NA in which no display pixels DP are provided. The frame area NA surrounds the display area DA. The display area DA includes a low-density area (first area) LA behind which an imaging element is provided and a high-density area (second area) HA behind which no imaging element is provided. In the low-density area LA according to the present embodiment, the display pixels DP are spaced out so that the pixel density is lower than that in the high-density area HA. In addition, an imaging layer 1 (see FIG. 2) of a camera including an imaging element, an image sensor, or the like is provided on the back face of the display device 100 to overlap the low-density area LA in a plan view.

Note that, although FIG. 1 illustrates an example in which the low-density area LA is provided in a central portion of the display device 100, a position thereof is not limited thereto, and the low-density area LA may be provided, for example, close to an end portion of the display device 100, in other words, close to an end portion of the display area DA.

In addition, although the example in which the low-density area LA is provided in a square shape has been described in the present embodiment, a shape thereof is not limited thereto, and the low-density area LA may have, for example, a circular shape or an elliptical shape, and a shape thereof may be determined as appropriate.

Figure 3:
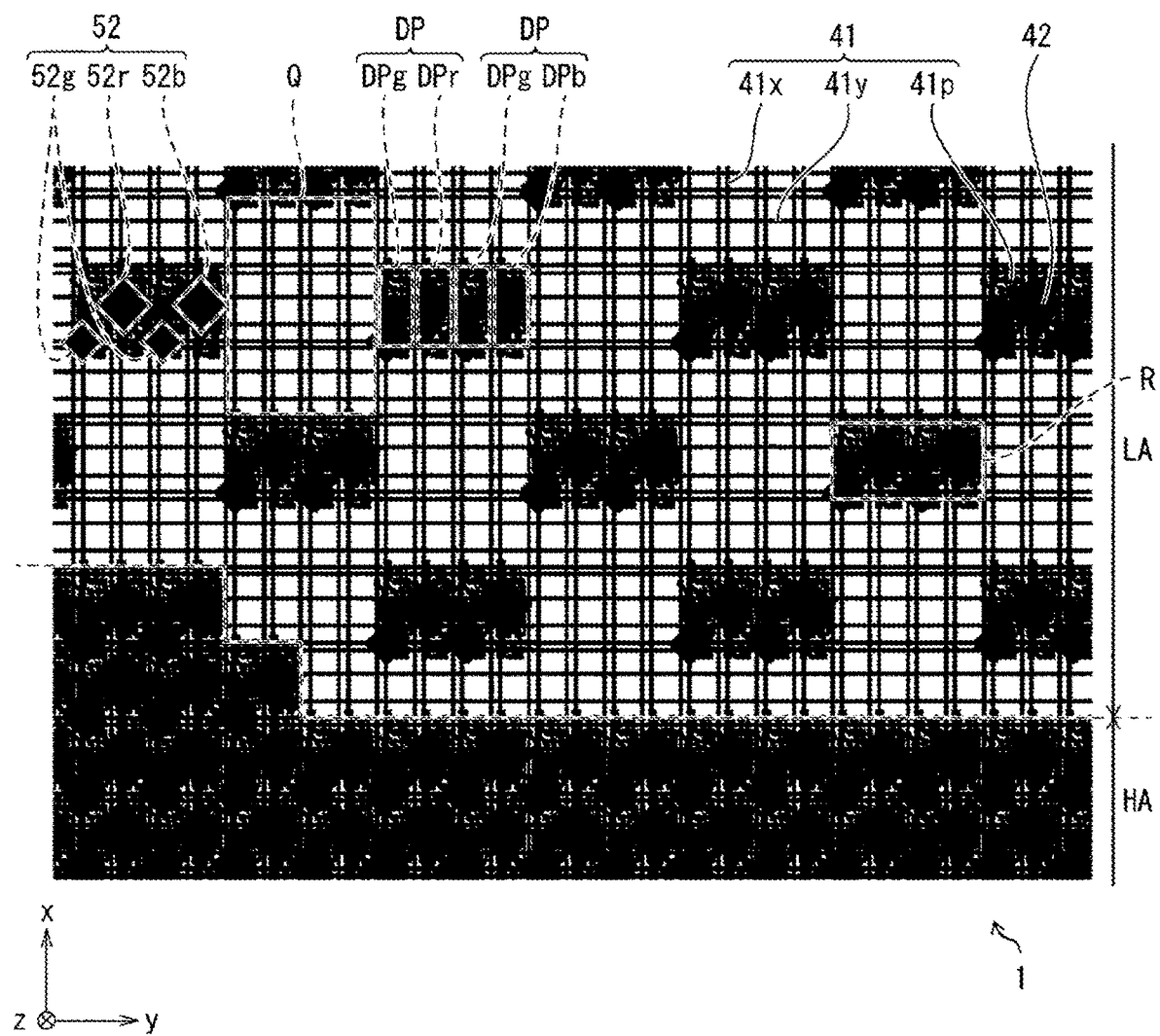
FIG. 3 is a partial plan view illustrating an example of the vicinity of the boundary between a first area and a second area in the display layer illustrated in FIG. 2.

A plurality of display pixels DP are provided in the display area DA of the display device 100, and each display pixel DP includes a green sub-display pixel DPg and a red sub-display pixel DPr or includes the green sub-display pixel DPg and a blue sub-display pixel DPb (see FIG. 3). Although the example in which one display pixel DP includes two sub-display pixels is described in the present embodiment, a configuration thereof is not limited thereto. For example, one display pixel DP may include three or more sub-display pixels, such as a red sub-display pixel, a green sub-display pixel, and a blue sub-display pixel, or may include only one sub-display pixel.

Each sub-display pixel includes one pixel circuit PC and one or more self-light-emitting elements ES. The pixel circuit PC controls light emission of its corresponding self-light-emitting element ES. In the disclosure, an example in which a sub-display pixel includes one self-light-emitting element ES will be described to simplify description.

The number and distribution of sub-display pixels correspond to the number and distribution of display pixels DP.

Thus, the density of the sub-display pixels, the pixel circuits PC, and the self-light-emitting elements ES in the low-density area LA is lower than the density of the sub-display pixels, the pixel circuits PC, and the self-light-emitting elements ES in the high-density area HA.

The display device 100 may include, for example, a source drive circuit SD at an end portion of the frame area NA in the x direction and gate drive circuits GD at an end portion of the frame area NA in the y direction. A plurality of wiring lines (not illustrated) each connecting from of a respective one of the source drive circuit SD and the gate drive circuits GD to a respective one of the plurality of display pixels DP are provided. In the disclosure, a direction orthogonal to the display surface of the display device 100 is defined as a z direction, and a plane parallel to the display surface is defined as an x-y plane.

Cross-Sectional Configuration of Display Device

Figure 2:
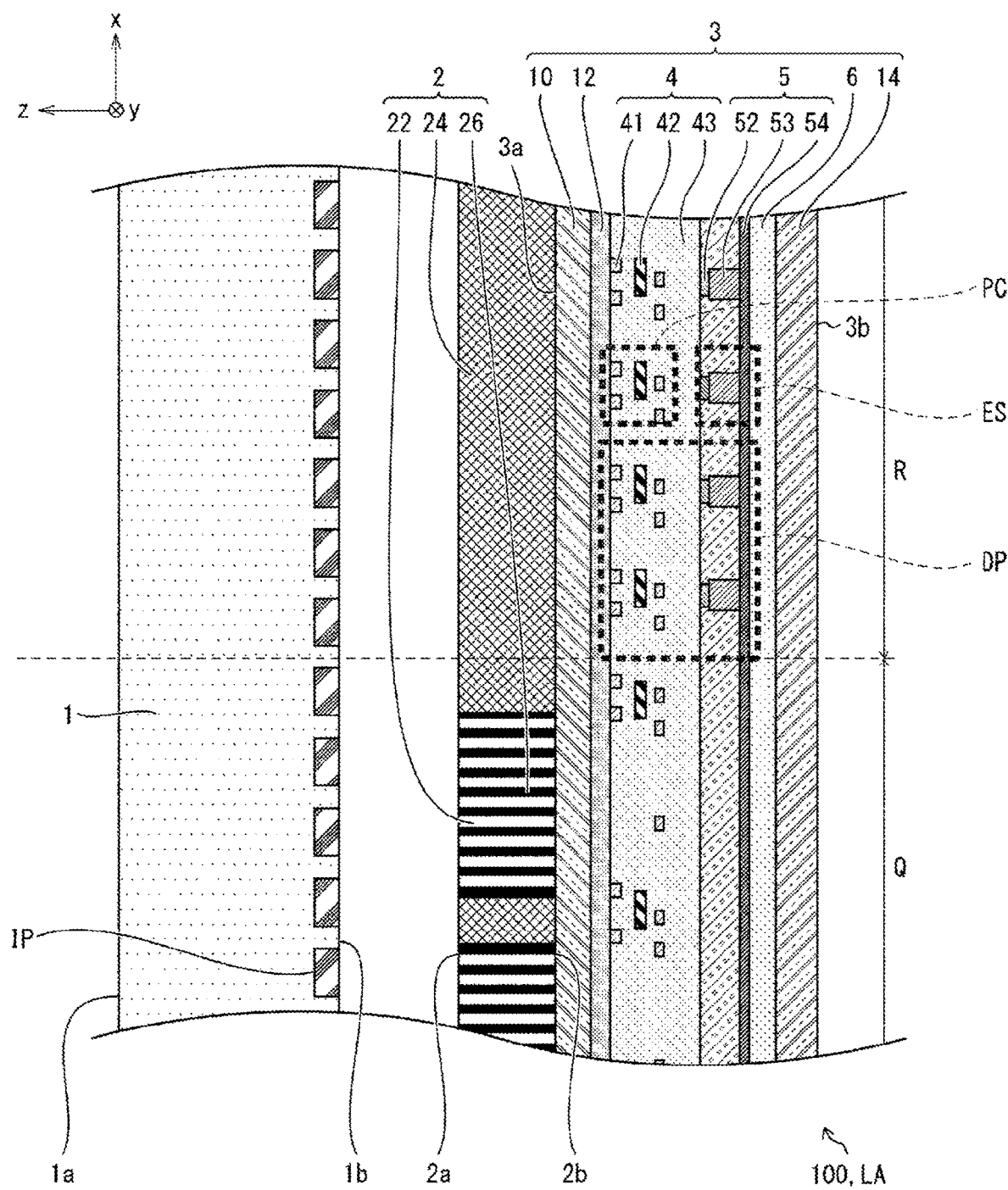
FIG. 2 is a partial cross-sectional view illustrating an example of a schematic configuration of the display device illustrated in FIG. 1.

FIG. 2 is a partial cross-sectional view illustrating an example of a schematic configuration of the display device 100 in the low-density area LA illustrated in FIG. 1.

The display device 100 includes the imaging layer 1 (first layer) including imaging pixels IP (imaging elements), a light guide layer 2 (second layer) positioned as a layer above the imaging layer 1 (right side in FIG. 1) and including light guide elements 22 that guide light incident from above (right side in FIG. 1) to the imaging pixels IP positioned below (left side in FIG. 1), and a display layer 3 (third layer) positioned as a layer above the light guide layer 2 (right side in FIG. 1) and including the display pixels DP as illustrated in FIG. 2. A display pixel DP includes the pixel circuits PC and the self-light-emitting elements ES having a pixel electrode 52 as will be described below.

"Light" mentioned in the disclosure means light in a wavelength region used by the imaging layer 1 for imaging, unless otherwise stated. "Light" in the disclosure means, for example, infrared light in a case that the imaging layer 1 includes an infrared camera or an infrared image sensor, and means visible light in a case that the imaging layer 1 includes a visible light camera or a visible light image sensor. In addition, "blocking" and "light blocking" in the disclosure mean at least one of absorption and reflection of light unless otherwise stated.

In the disclosure, a lower surface 1a and an upper surface 1b of the imaging layer 1, a lower surface 2a and an upper surface 2b of the light guide layer 2, and a lower surface 3a and an upper surface 3b of the display layer 3 are parallel to each other. The upper surface 1b of the imaging layer 1 is preferably separated from the light guide layer 2 in order that a mechanical load is not applied to the imaging layer 1 and the position of the imaging layer 1 can be adjusted for adjustment of the optical system. On the other hand, the upper surface 2b of the light guide layer 2 is preferably close to the display layer 3, and particularly preferably in contact with the display layer 3 in order to prevent occurrence of diffraction and interference between the light guide layer 2 and the display layer 3.

Imaging Layer

The imaging layer 1 has a plurality of imaging pixels IP on the upper surface 1b thereof and is configured to acquire an image based on light incident on the imaging pixels IP. In order to allow sufficient light to be incident on the imaging pixels IP, the imaging pixels IP are arranged to overlap the low-density area LA in a plan view taken from the z direction. The imaging layer 1 may include, for example, a camera such as a far-infrared camera, a near-infrared camera, and a visible light camera, or an image sensor such as a finger vein authentication sensor or a retina sensor.

Light Guide Layer

The light guide layer 2 includes a plurality of light guide elements 22. The light guide elements 22 are arranged to overlap the low-density area LA in a plan view taken from the z direction so that sufficient light is incident on the imaging pixels IP. The light guide elements 22 are arranged at positions not overlapping the display pixels DP in the low-density area LA in a plan view taken from the z direction so that light diffracted by the display pixel DP is prevented from being incident on the imaging pixels IP. Hereinafter, an area in the low-density area LA in which neither pixel circuits PC nor pixel electrodes 52 of the display pixels DP are provided is referred to as an opening area Q. In other words, the light guide elements 22 are arranged such that the light guide elements 22 overlap the opening area Q.

The light guide elements 22 are made from a transparent material so as to guide light incident on the light guide elements 22 from above to below. The transparent material includes, for example, organic materials such as a polyimide and acrylic, and inorganic materials such as a silicon oxide film, a silicon nitride film, a silicon oxynitride film, and alumina.

In the example illustrated in FIG. 2, the light guide layer 2 further includes a plurality of light-blocking areas 24. In order to prevent light diffracted by the display pixels DP from being incident on the imaging pixels IP, the light-blocking areas 24 are arranged at positions overlapping (the pixel circuits PC and the pixel electrodes 52 of) the display pixels DP in the low-density area LA in the plan view taken from the z direction. Hereinafter, the area in the low-density area LA in which the pixel circuits PC and the pixel electrodes 52 of the display pixels DP are provided is referred to as a pixel area R. In other words, the light-blocking areas 24 are arranged such that the light-blocking areas 24 overlap the pixel area R. In addition, the light-blocking areas 24 may be arranged in a portion of the opening area Q in which light is easily diffracted, for example, a portion in which signal wiring lines are densely arranged.

The light-blocking areas 24 are made from a light-blocking material containing a light reflecting material and a light absorbing material so as to block light incident on the light-blocking areas 24 from above. The light reflecting material may be a metal material that reflects light and used for reflective electrodes and wiring lines, including, for example, a silver (Ag) alloy, aluminum (Al), tungsten (W), molybdenum (Mo), tantalum (Ta), chromium (Cr), titanium (Ti), and copper (Cu). The light absorbing material absorbs light and includes, for example, carbon and silicon.

In the example illustrated in FIG. 2, the light guide layer 2 further includes boundary portions 26 each arranged between the light guide elements 22. The boundary portions 26 are made from a transparent material having a higher refractive index than that of the light guide elements 22 or a light-blocking material so as to absorb or reflect light incident on the boundary portions 26 from the light guide elements 22. The boundary portions 26 may be arranged between the light guide elements 22 and the light-blocking areas 24, or may be arranged to surround the entire light guide elements 22 and the light-blocking areas 24 in a plan view.

The light-blocking areas 24 and the boundary portions 26 may be integrally formed. For example, the light-blocking areas 24 and the boundary portions 26 may be simultaneously made from the same light-blocking material. For example, when the boundary portions 26 are made from a transparent material having a higher refractive index than that of the light guide elements 22, the light-blocking areas 24 may be formed such that the upper surface of the transparent material is covered with a light-blocking material.

Thus, the light guide elements 22 function as optical fibers that guide light incident on the upper surface 2b to the lower surface 2a. Therefore, diffraction and interference are reduced while light passes through the light guide layer 2. As described above, the imaging pixels IP overlap the low-density area LA, the light guide elements 22 overlap the opening area Q, the light-blocking areas 24 overlap the pixel area R, the opening area Q is an area in which no display pixels DP are provided in the low-density area LA, and the pixel area R is an area in which the display pixels DP are provided in the low-density area LA. For this reason, light having passed through the light guide elements 22 is incident on the imaging pixels IP overlapping the opening area Q. On the other hand, light is not incident on the imaging pixels IP overlapping the pixel area R because the light is blocked by the light-blocking areas 24.

Display Layer

The display layer 3 has the display pixels DP so as to display an image on the upper surface 3b, and also has the low-density area LA and the high-density area HA. The display pixels DP are arranged in the high-density area HA at a density equivalent to that of a display area of a normal display device that does not include an imaging layer. On the other hand, the display pixels DP are arranged in the low-density area LA at a lower density than that in the high-density area HA to make a sufficient amount of light incident on the imaging pixels IP. Thus, the density of the pixel circuits PC and the pixel electrodes 52 in the low-density area LA is lower than the density of the pixel circuits PC and the pixel electrodes 52 in the high-density area HA.

The display layer 3 includes a lower surface film 10, a barrier layer 12, a thin film transistor layer 4, a light-emitting element layer 5, a sealing layer 6, and an upper surface film 14 in this order from the lower surface 3a to the upper surface 3b.

The lower surface film 10 and the upper surface film 14 are layers that are light-transmissive and prevent the thin film transistor layer 4 and the light-emitting element layer 5 from being mechanically damaged.

The barrier layer 12 and the sealing layer 6 are layers that are light-transmissive and prevent foreign substances such as water and oxygen from infiltrating into the thin film transistor layer 4 and the light-emitting element layer 5.

The thin film transistor layer 4 is a layered body including a light-blocking conductive layer 41, a light-blocking semiconductor layer 42, and a light-transmissive insulating layer 43. The conductive layer 41 is formed of, for example, a single layer film or a layered film of metal including at least one of aluminum (Al), tungsten (W), molybdenum (Mo), tantalum (Ta), chromium (Cr), titanium (Ti), and copper (Cu). The semiconductor layer 42 is formed of, for example, amorphous silicon (a-Si), low-temperature polysilicon (LTPS), or an oxide semiconductor such as an InGaZnO-based oxide semiconductor.

The thin film transistor layer 4 forms the pixel circuits PC (see FIG. 2).

The light-emitting element layer 5 includes a plurality of pixel electrodes 52, a common electrode 54 facing the plurality of pixel electrodes 52, and an electroluminescent layer 53 between the pixel electrodes 52 and the common electrode 54.

The pixel electrodes 52 are reflective electrodes that reflect light and are formed of reflective conductive layers. The pixel electrodes 52 are formed of, for example, a single layer film or a layered film of metal including at least one of aluminum (Al), tungsten (W), molybdenum (Mo), tantalum (Ta), chromium (Cr), titanium (Ti), and copper (Cu). Each pixel electrode 52 is connected to the corresponding pixel circuit PC. The common electrode 54 is formed of a light-transmissive conductive layer and made from, for example, a transparent metal oxide such as indium tin oxide (ITO) or indium zinc oxide (IZO). Each pixel electrode 52 may be either the anode or the cathode of the self-light-emitting element ES. The common electrode 54 is the cathode of the self-light-emitting element ES when the pixel electrode 52 is the anode of the self-light-emitting element ES, and is the anode of the self-light-emitting element ES when the pixel electrode 52 is the cathode of the self-light-emitting element ES.

The pixel circuits PC are connected to the corresponding pixel electrodes 52 and control the potential of the connected pixel electrodes 52. Thus, the pixel circuits PC control light emission of the corresponding self-light-emitting elements ES.

The electroluminescent layer 53 includes at least a light-emitting layer containing an organic light-emitting material or an inorganic light-emitting material such as quantum dots. The electroluminescent layer 53 may optionally include additional layers such as charge injection layers, charge transport layers, charge generation layers, and charge blocking layers.

The pixel electrodes 52, the common electrode 54, and the electroluminescent layer 53 form the self-light-emitting elements ES included in the display pixels DP. The self-light-emitting elements ES may be organic light-emitting diodes (OLED) or quantum dot light-emitting diodes (QLED).

Planar Configuration of Display Layer

Hereinafter, a planar configuration of the display layer 3, in particular, a light-blocking pattern of the display layer 3, will be described with reference to FIG. 3.

FIG. 3 is a partial plan view illustrating an example of the vicinity of the boundary between the low-density area LA and the high-density area HA in the display layer 3. In FIG. 3, only the conductive layer 41, the semiconductor layer 42, and the pixel electrodes 52 are illustrated and other components are omitted to make it easier to understand the disclosure.

In the example illustrated in FIG. 3, the display pixels DP are arranged in a PenTile array. Half of the display pixels DP are constituted by a combination of the green sub-display pixel DPg and the red sub-display pixel DPr, and the other half of the display pixels DP are constituted by a combination of the green sub-display pixel DPg and the blue sub-display pixel DPb. Without being limited to this, the display pixels DP may be arranged in another array pattern such as a delta array or a stripe array.

The density of the display pixels DP in the low-density area LA is lower than the density of the display pixels DP in the high-density area HA as described above. In the example illustrated in FIG. 3, the density of the display pixels DP in the low-density area LA is one fourth of the density of the display pixels DP in the high-density area HA.

The conductive layer 41 includes a wiring line 41x extending in the x direction and a wiring line 41y extending in the y direction. The wiring line out of the wiring lines 41x and 41y corresponding to the low-density area LA extends over the low-density area LA and the high-density area HA. The wiring line 41x includes, for example, source signal lines for supplying signals based on image data from the source drive circuit SD to each sub-display pixel and power lines for supplying a power supply voltage to each sub-display pixel. The wiring line 41y includes, for example, gate signal lines for supplying a gate signal for controlling writing to each sub-display pixel from the gate drive circuit GD, light-emission signal lines for supplying a light-emission signal for controlling light emission of each sub-display pixel, and refresh potential lines for supplying a refresh potential to each sub-display pixel.

The conductive layer 41 further includes a wiring line 41p in the pixel area R. The wiring line 41p include gate electrodes, source electrodes, and drain electrodes of transistors included in the pixel circuits PC, a wiring line connecting the transistors to the wiring line 41x and 41y, a wiring line connecting the transistors to each other, a wiring line connecting the transistors to the pixel electrodes 52, and the like.

The semiconductor layer 42 includes, in the pixel area R, a channel layer of transistors included in the pixel circuits PC, a wiring line connecting the transistors to each other, and the like.

The pixel electrodes 52 include red pixel electrodes 52r formed in the red sub-display pixels DPr, green pixel electrodes 52g formed in the green sub-display pixels DPg, and blue pixel electrodes 52b formed in the blue sub-display pixels DPb.

For this reason, the light-blocking pattern as illustrated in FIG. 3 is formed in the display layer 3 by the conductive layer 41, the semiconductor layer 42, and the pixel electrodes 52. Most of the light-blocking pattern is formed by the pixel circuits PC and the pixel electrodes 52, and is positioned in the pixel area R. The rest of the light-blocking pattern is formed by wiring lines connected to the pixel circuits PC, such as the wiring lines 41x and 41y, and is located in both the pixel area R and the opening area Q.

Quality of Captured Image

Hereinafter, improvement in the quality of captured images by the light guide layer 2 will be described with reference to FIGS. 4 and 5.

Figure 4:
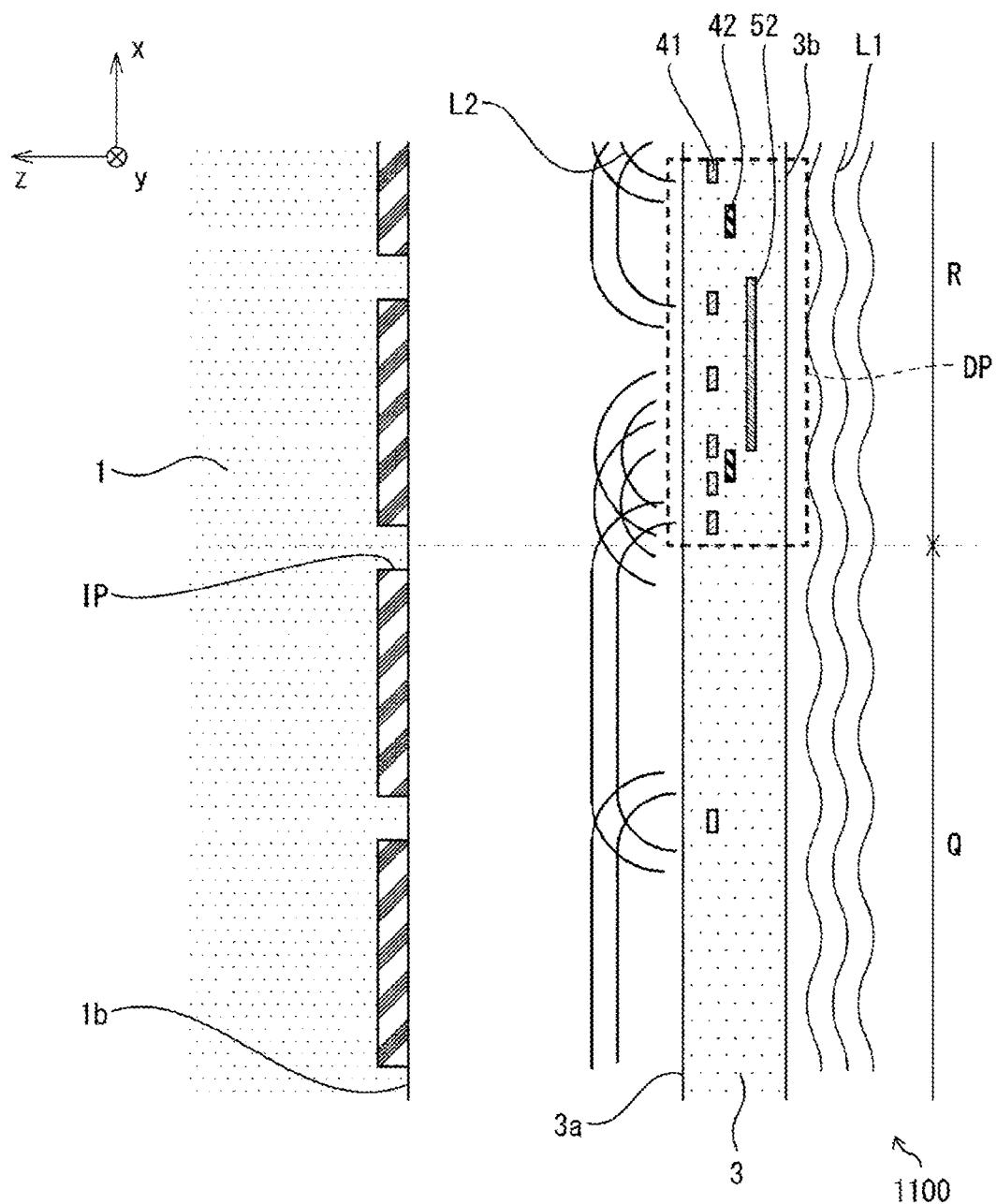
FIG. 4 is a partial cross-sectional view illustrating transmitted light in a display device of a comparative example in which no light guide layer is provided between an imaging layer and a display layer.

FIG. 4 is a partial cross-sectional view illustrating transmitted light L2 in a display device 1100 of a comparative example in which no light guide layer 2 is provided between the imaging layer 1 and the display layer 3. Incident light L1 illustrated in FIG. 4 is parallel light whose optical axis is parallel to the z direction.

Part of the incident light L1 is blocked by the above-described light-blocking pattern formed in the display layer 3 while the incident light L1 is transmitted through the display layer 3 as illustrated in FIG. 4. Then, the rest of the light that has reached the lower surface 3a of the display layer 3 becomes the transmitted light L2. The transmitted light L2 is diffracted and interferes in accordance with the light-blocking pattern and the wavelength of the light itself between the lower surface 3a of the display layer 3 and the upper surface 1b of the imaging layer 1. As a result, an interference pattern is generated on the upper surface 1b of the imaging layer 1.

Thus, in the comparative example illustrated in FIG. 4, a captured image of the imaging layer 1 is an image obtained by superimposing the interference pattern caused by the display layer 3 on a captured image of a case in which neither the display layer 3 nor the light guide layer 2 is provided (hereinafter, an "original captured image"). A captured image on which such an interference pattern is superimposed includes bleeding and periodic noise, which lowers the quality. In addition, digital filtering for removing such an interference pattern deteriorates the quality of captured images.

Figure 5:
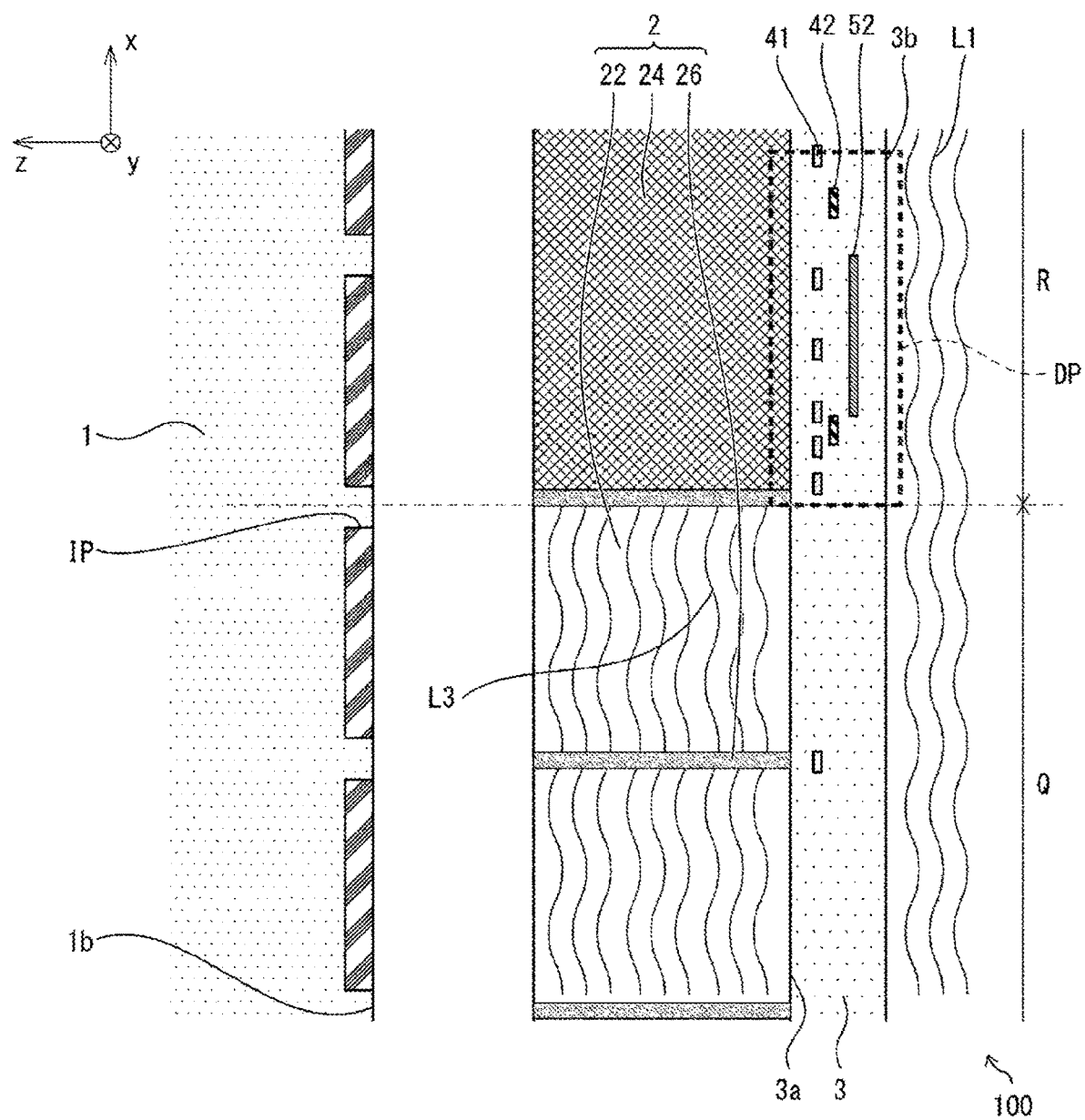
FIG. 5 is a partial cross-sectional view illustrating transmitted light in the display device according to an embodiment of the disclosure in which a light guide layer is provided between an imaging layer and the display layer.

FIG. 5 is a partial cross-sectional view illustrating transmitted light L3 in the display device 100 according to the present embodiment in which the light guide layer 2 is provided between the imaging layer 1 and the display layer 3. Incident light L1 illustrated in FIG. 5 is parallel light whose optical axis is parallel to the z direction.

Part of the incident light L1 is blocked by the above-described light-blocking pattern formed in the display layer 3 while the incident light L1 is transmitted through the display layer 3 as illustrated in FIG. 5. Then, the rest of the light that has reached the lower surface 3a of the display layer 3 becomes the transmitted light L3. The transmitted light L3 is incident on the light guide layer 2 from the lower surface 3a of the display layer 3. The light guide elements 22 of the light guide layer 2 function as optical fibers as described above to guide the transmitted light L3 to the imaging layer 1. On the other hand, the light-blocking areas 24 and the boundary portion 26 block the transmitted light L3. As a result, only the light incident on the opening area Q and the light guide element 22 of the incident light L1 can contribute to captured images.

Whereas most of the light-blocking pattern such as the pixel circuits PC and the pixel electrodes 52 are positioned in the pixel area R as described above, only the rest of the light-blocking pattern such as the wiring lines 41x and 41y is positioned in the opening area Q. For this reason, the interference pattern caused by the light-blocking pattern in the opening area Q is lighter than the interference pattern caused by the light-blocking pattern in the pixel area R. Furthermore, since the light guide elements 22 function like optical fibers, light passing through different light guide elements 22 does not interfere with each other. For this reason, while the transmitted light L3 passes through the light guide elements 22 of the light guide layer 2, growth of the interference pattern is curbed.

For the above reason, the interference pattern affecting captured images in the configuration illustrated in FIG. 5 is reduced more than the interference pattern affecting captured images in the configuration illustrated in FIG. 4. As a result, a captured image of the imaging layer 1 in the example illustrated in FIG. 5 becomes an image in which the reduced interference pattern is superimposed on the original captured image. Therefore, the captured image in FIG. 5 has less bleeding and less periodic noise than the captured image in FIG. 4, and has a higher quality.

Mounting Method

The light guide layer 2 can be mounted on the lower surface 3a of the display layer 3 in various methods.

For example, a light guide film suitable for the light guide layer 2 may be manufactured in a well-known method, and then the light guide film may be aligned with the conductive layer 41 and/or the pixel electrodes 52 of the display layer 3 and attached onto the lower surface 3a of the display layer 3. Alternatively, for example, the display layer 3 may be manufactured, and then the light guide layer 2 may be formed on the lower surface 3a of the display layer 3 by using a method such as ink-jet printing.

Alternatively, the light guide layer 2 may be incorporated in the display layer 3.

For example, the lower surface film 10 and/or the barrier layer 12 may be formed so that the lower surface film 10 and/or the barrier layer 12 serve as the light guide layer 2. In addition, for example, an additional layer serving as the light guide layer 2 may be formed between the lower surface film 10 and the thin film transistor layer 4. This additional layer can be formed in a series of film forming steps for forming the barrier layer 12 and the thin film transistor layer 4.

Preferred Arrangement of Light Guide Elements

Hereinafter, a preferable arrangement of the light guide elements 22 of the light guide layer 2 will be described with reference to FIGS. 6 to 8.

Figure 6:
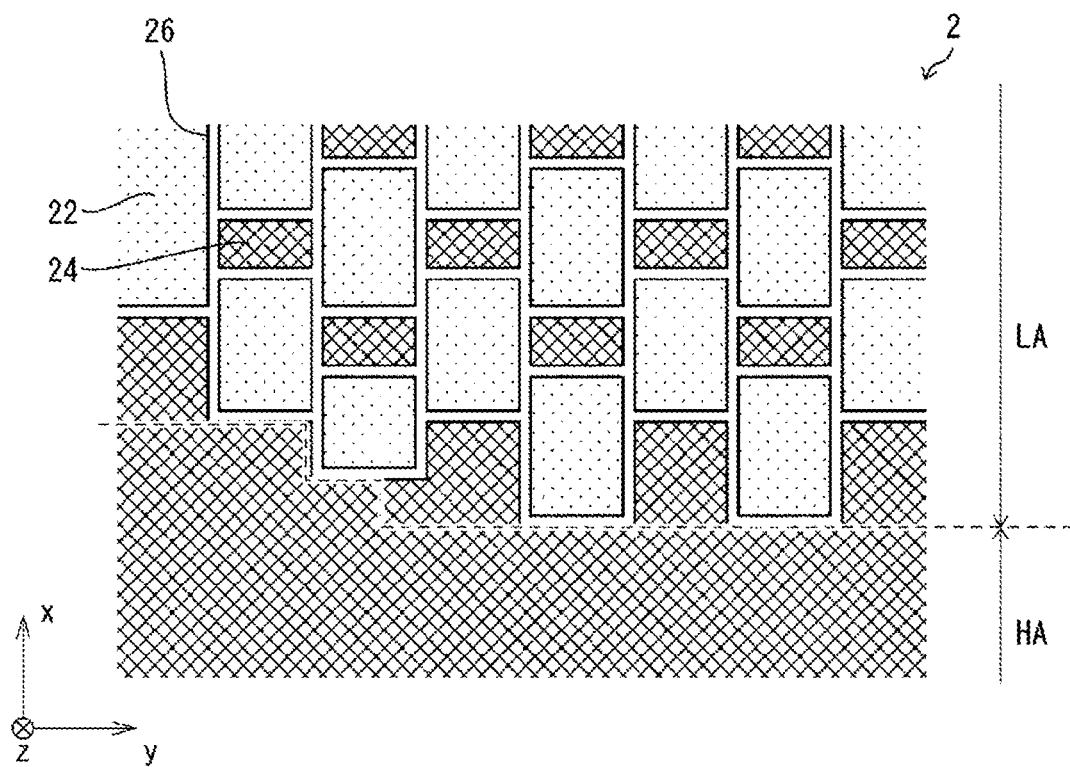
FIG. 6 is a partial plan view illustrating a preferred example of a light guide layer corresponding to the light-blocking pattern illustrated in FIG. 3.

FIG. 6 is a partial plan view illustrating a preferred example of the light guide layer 2 corresponding to the light-blocking pattern illustrated in FIG. 3. FIG. 7 is a partial plan view illustrating the boundary portion 26 illustrated in FIG. 6 superimposed on the light-blocking pattern illustrated in FIG. 3. FIG. 8 is a partial plan view illustrating an example of a configuration in which another boundary portion 26 is further added to the boundary portion 26 illustrated in FIG. 6 superimposed on the light-blocking pattern illustrated in FIG. 3.

Figure 7:
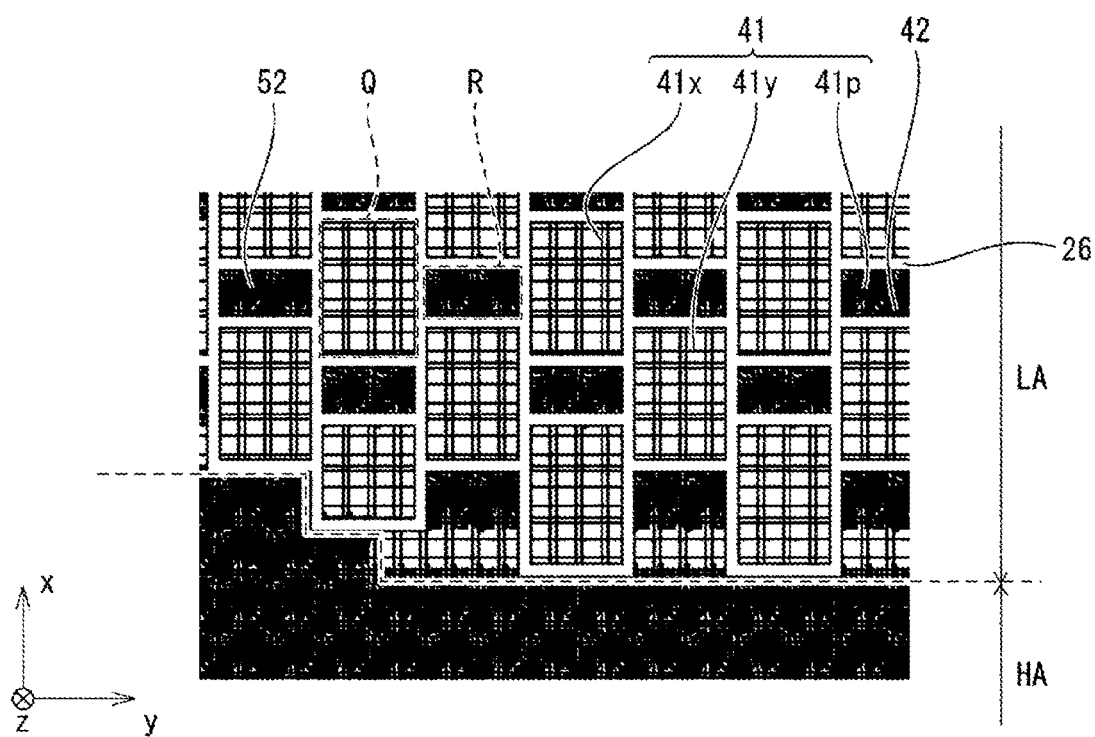
FIG. 7 is a partial plan view illustrating the boundary portion illustrated in FIG. 5 superimposed on the light-blocking pattern illustrated in FIG. 3.
Figure 8:
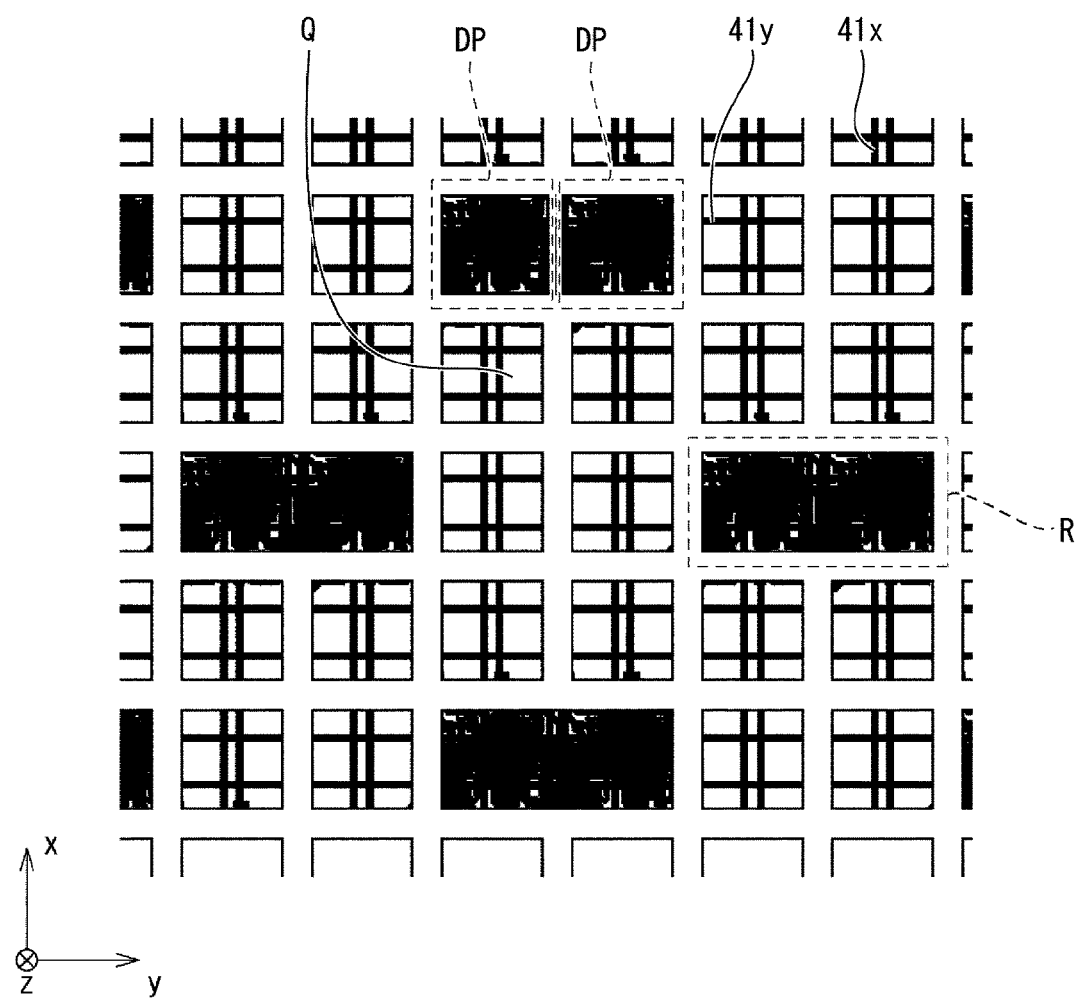
FIG. 8 is a partial plan view illustrating an example of a configuration in which another boundary portion is further added to the boundary portion illustrated in FIG. 5 superimposed on the light-blocking pattern illustrated in FIG. 3.

The light guide elements 22 overlap the opening area Q, and the light-blocking areas 24 overlap the pixel area R as illustrated in FIGS. 6 and 7. With this arrangement, light transmitted through the display pixels DP is blocked by the light-blocking areas 24 and does not reach the imaging pixels IP. For this reason, the influence of diffraction and interference caused by the display pixels DP on the imaging layer 1 is reduced. On the other hand, light transmitted through the opening area Q is guided by the light guide elements 22 and reaches the imaging pixels IP. Therefore, the imaging layer 1 can use the light transmitted through the opening area Q with high efficiency. In other words, a large effective opening area of the imaging layer 1 can be obtained.

Furthermore, the display pixels DP and the light-blocking areas 24 are arranged in a PenTile array. That is, the light-blocking areas 24 are arrayed according to the same array pattern as the display pixels DP. For this reason, the light-blocking areas 24 and the light guide elements 22 can be efficiently arranged such that the light-blocking areas 24 overlap the pixel area R having the display pixels DP and the light guide elements 22 overlap the opening area Q having no display pixels DP. Since the light-blocking areas 24 can be efficiently arranged for the display pixels DP in this manner, the effective opening area of the imaging layer 1 can be increased. In addition, the imaging pixels IP and the light guide elements 22 are preferably arranged such that the light guide elements 22 overlap the imaging pixels IP.

In addition, the boundary portions 26 overlap at least a part of the wiring lines 41x and 41y in the low-density area LA. For this reason, the influence of diffraction and interference caused by the wiring lines 41x and 41y on the imaging layer 1 is reduced as well. The boundary portions 26 may be additionally formed to overlap a larger number of the wiring lines 41x and 41y as illustrated in FIG. 8, and although not illustrated, the boundary portions 26 may be additionally formed to overlap all of the wiring lines 41x and 41y in the low-density area LA. The additional formation can help reduce the influence caused by the wiring lines 41x and 41y further.

In the example illustrated in FIGS. 6 and 7, there is only one light guide element 22 between the light-blocking areas 24 adjacent to each other in the x direction or the y direction. Thus, since the boundary portions 26 are small, the total area of the light guide elements 22 in the low-density area LA, that is, the effective opening area of the imaging layer 1, can be increased. On the other hand, two or more light guide elements 22 may be provided between the light-blocking areas 24 adjacent to each other in the x direction or the y direction as illustrated in FIG. 8. In this case, because the opening diameter of each light guide element 22 is small, diffraction and interference inside the light guide elements 22 can be reduced. In order to sufficiently reduce diffraction and interference, the interval between two adjacent display pixels DP is preferably larger than 10 times the diameter of the light guide element 22.

Another Preferred Arrangement of Light Guide Elements

Hereinafter, another preferable arrangement of the light guide elements 22 in the light guide layer 2 will be described with reference to FIGS. 9 to 10.

Figure 9:
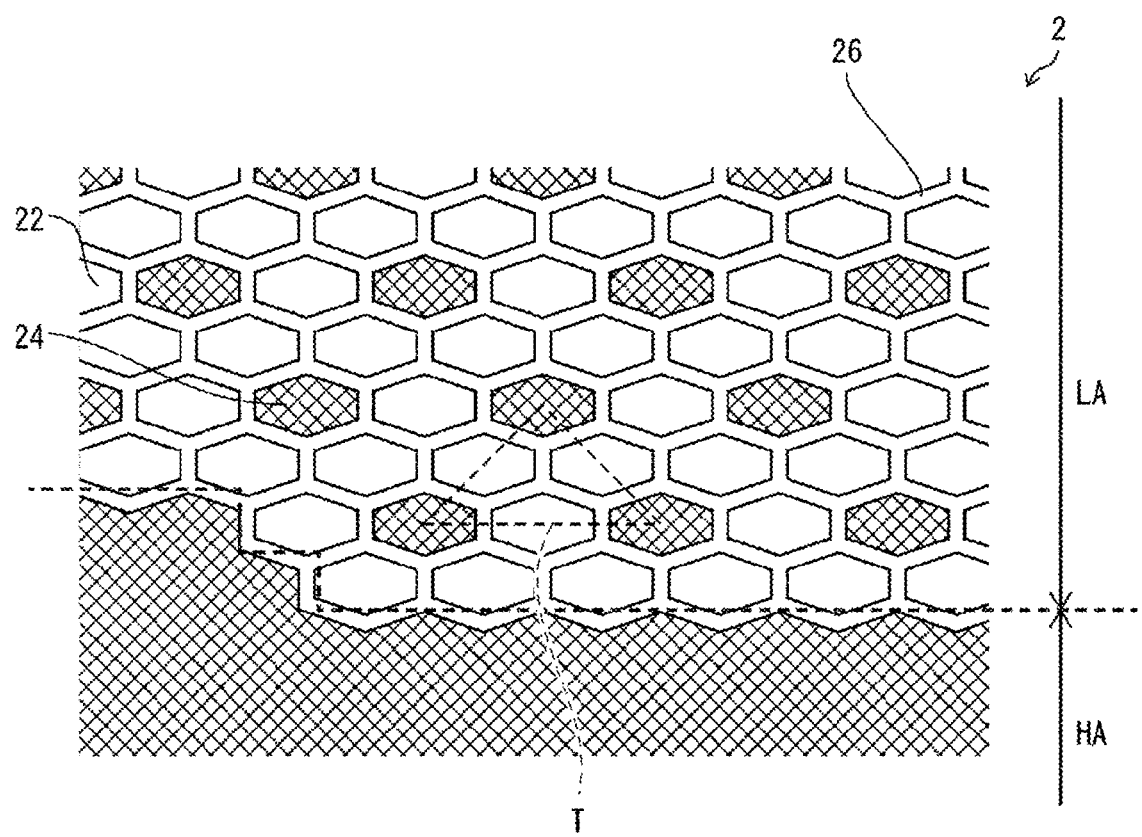
FIG. 9 is a partial plan view illustrating another preferred example of the light guide layer corresponding to the light-blocking pattern illustrated in FIG. 3.

FIG. 9 is a partial plan view illustrating another preferred example of the light guide layer 2 corresponding to the light-blocking pattern illustrated in FIG. 3. FIG. 10 is a partial plan view illustrating the boundary portions 26 illustrated in FIG. 9 superimposed on the light-blocking pattern illustrated in FIG. 3.

Figure 10:
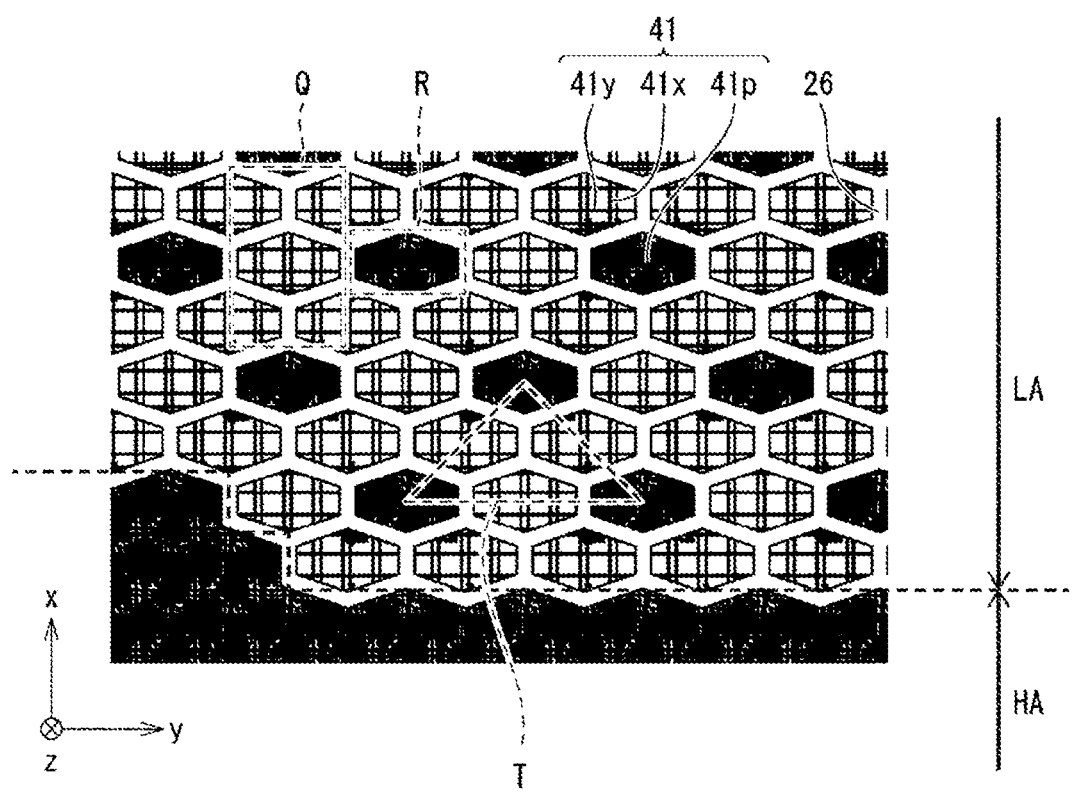
FIG. 10 is a partial plan view illustrating the boundary portion illustrated in FIG. 8 superimposed on the light-blocking pattern illustrated in FIG. 3.

In the examples illustrated in FIGS. 9 and 10, the light guide elements 22 overlap the opening area Q, and the light-blocking areas 24 overlap the pixel area R, as in the examples illustrated in FIGS. 6 and 7. On the other hand, unlike the example illustrated in FIGS. 6 and 7, the display pixels DP are arranged in accordance with the PenTile array, and the light-blocking areas 24 are arranged in accordance with a delta array in the example illustrated in FIGS. 9 and 10. Specifically, an imaginary triangle T having a vertex at the center of the pixel area R is assumed, the triangle T is spread over the low-density area LA, and hexagons are spread such that each vertex of the triangle T and the center point of each side thereof are centered. Among the spread hexagons, the hexagons corresponding to the vertices of the triangle T are the light-blocking areas 24, and the hexagons corresponding to the center points of the sides of the triangle T are areas in which the light guide elements 22 are provided.

Such a light guide layer 2 is useful for a configuration in which the imaging pixels IP of the imaging layer 1 are arranged in a delta array. In other words, the light-blocking areas 24 and the opening areas Q preferably follow the same array pattern as that of the imaging pixels IP of the imaging layer 1. In this case, the light-blocking areas 24 and the light guide elements 22 can be efficiently arranged so that the imaging pixels IP overlap the opening area Q (in particular, the light guide elements 22). Since the light guide elements 22 can be efficiently arranged for the imaging pixels IP in this manner, the effective opening area of the imaging layer 1 can be increased. In addition, the imaging pixels IP and the light guide elements 22 are preferably arranged such that the light guide elements 22 overlap the opening area Q.

Further, as described above, the boundary portion 26 may be additionally formed.

Modified Example

Figure 11:
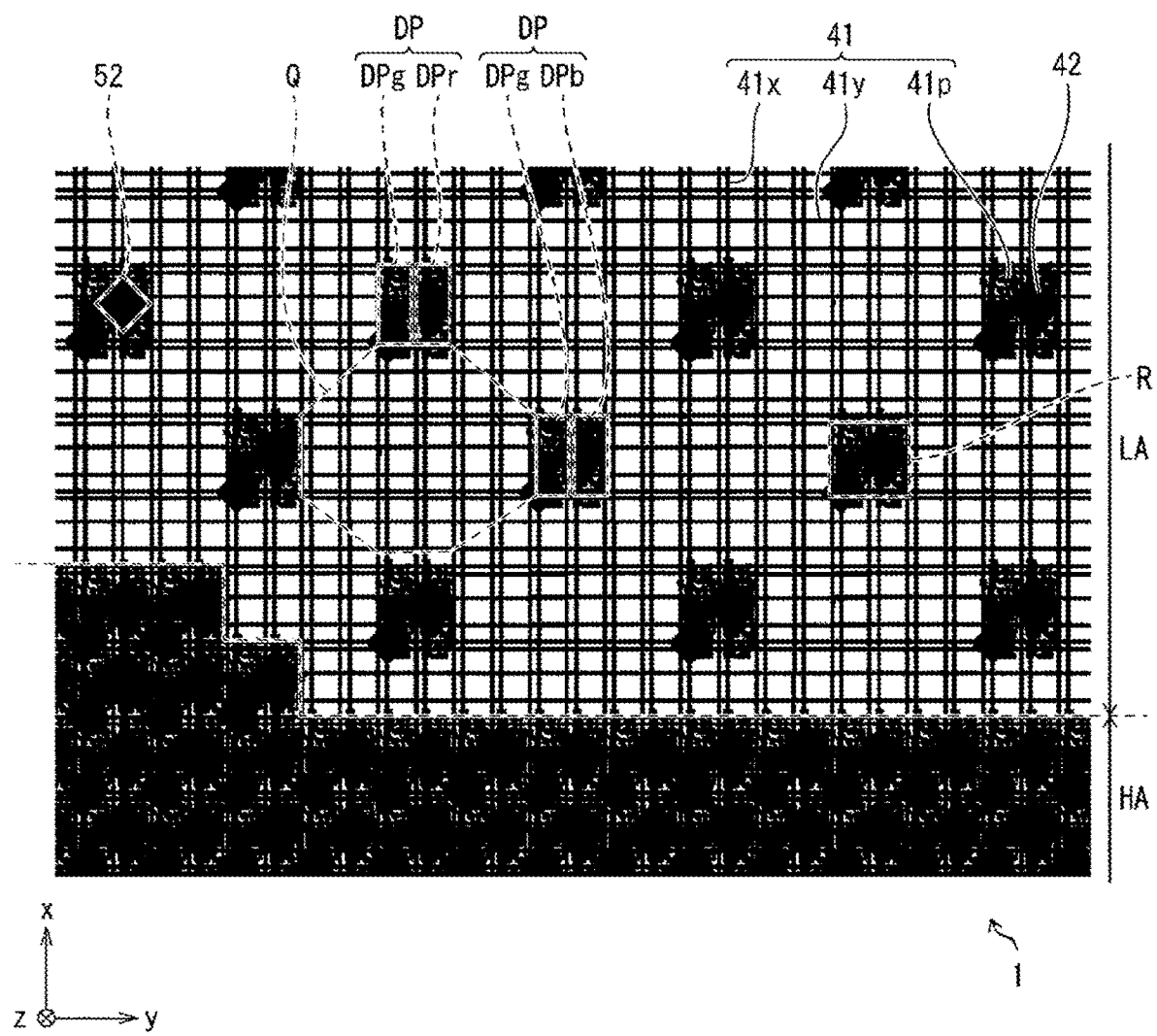
FIG. 11 is a partial plan view illustrating the vicinity of the boundary between a first area and a second area in a modified example of the display layer illustrated in FIG. 1.
Figure 12:
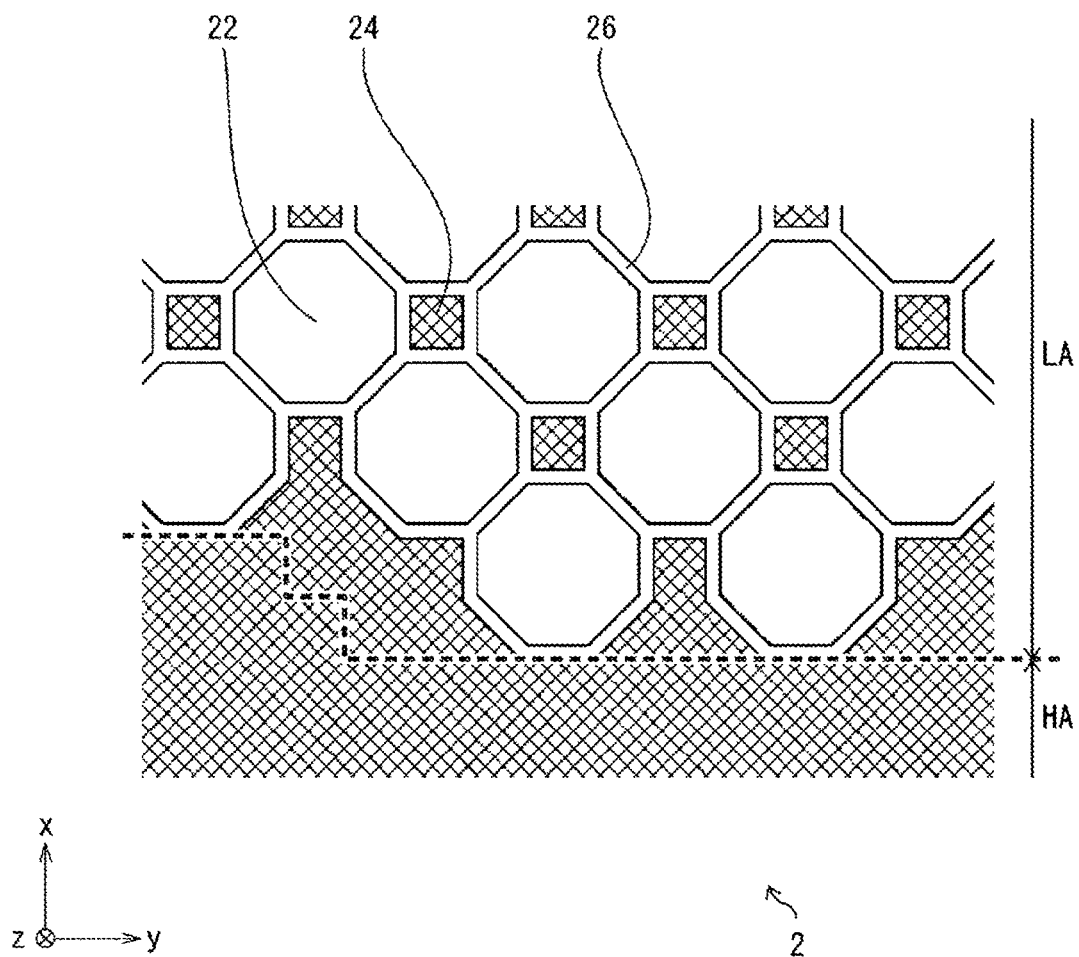
FIG. 12 is a partial plan view illustrating a preferred example of a light guide layer corresponding to the light-blocking pattern illustrated in FIG. 10.
Figure 13:
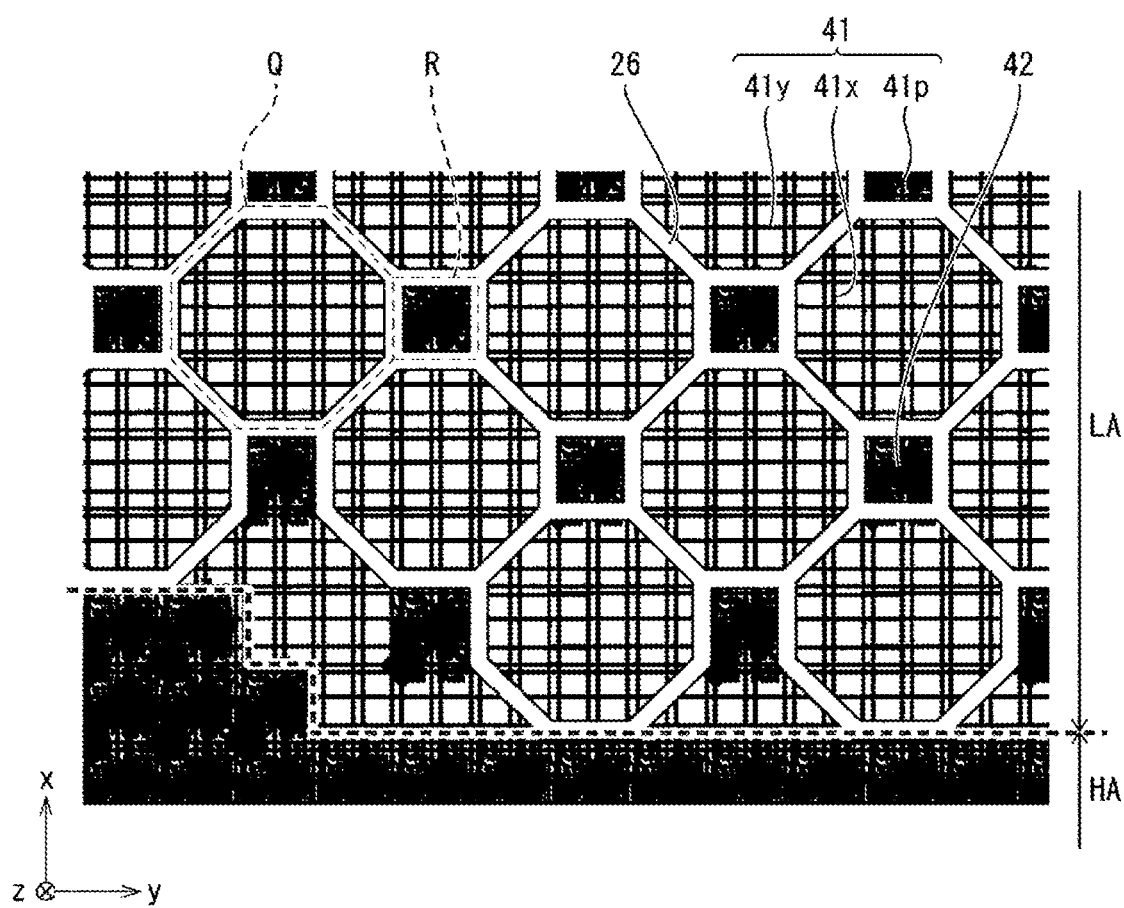
FIG. 13 is a partial plan view illustrating the boundary portion illustrated in FIG. 11 superimposed on the light-blocking pattern illustrated in FIG. 10.

FIG. 11 is a partial plan view illustrating a vicinity of the boundary between the low-density area LA and the high-density area HA according to a modified example of the display layer 3 illustrated in FIG. 2. In FIG. 11, only the conductive layer 41, the semiconductor layer 42, and the pixel electrodes 52 are illustrated and other components are omitted to make it easier to understand the disclosure. FIG. 12 is a partial plan view illustrating a preferred example of the light guide layer 2 corresponding to the light-blocking pattern illustrated in FIG. 11. FIG. 13 is a partial plan view illustrating the boundary portions 26 illustrated in FIG. 12 superimposed on the light-blocking pattern illustrated in FIG. 11.

A density of the display pixels DP in the low-density area LA of the display layer 3 may be even lower as illustrated in FIG. 11. In the example illustrated in FIG. 11, the density of the display pixels DP in the low-density area LA is one eighth of the density of the display pixels DP in the high-density area HA.

In this case, the light guide elements 22 are preferably formed in an octagonal shape overlapping the opening area Q, and the light-blocking area 24 is preferably formed in a square shape overlapping the pixel area R in a plan view taken from the z direction as illustrated in FIGS. 12 and 13. Furthermore, the boundary portion 26 may be additionally formed as described above. In addition, the imaging pixels IP are preferably arranged to overlap the light guide elements 22.

Second Embodiment

Another embodiment of the disclosure will be described below. Further, members having the same functions as those of the members described in the above-described embodiment will be denoted by the same reference numerals and signs, and the description thereof will not be repeated for the sake of convenience of description.

Figure 14:
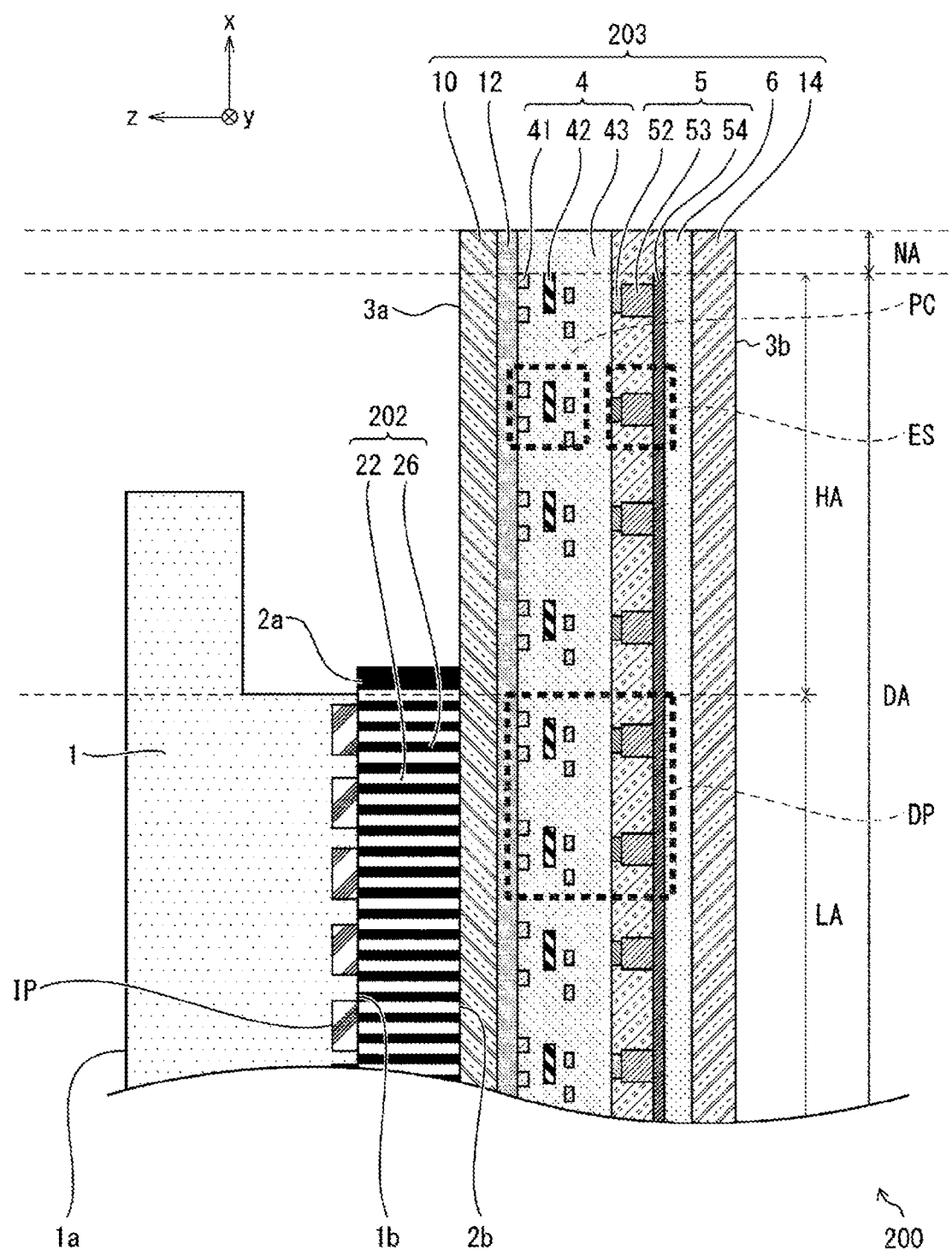
FIG. 14 is a partial cross-sectional view illustrating an example of a schematic configuration of a display device according to another embodiment of the disclosure.

FIG. 14 is a partial cross-sectional view illustrating an example of a schematic configuration of a display device 200 according to a second embodiment of the disclosure.

The display device 200 includes the imaging layer 1, a light guide layer 202, and a display layer 203 as illustrated in FIG. 14.

The display layer 203 according to the present embodiment has the same configuration as the display layer 3 according to the first embodiment described above except that the density of the display pixels DP in the low-density area LA is configured to be equal to the density of the display pixels DP in the high-density area HA.

The light guide layer 202 according to the present embodiment has the same configuration as that of the light guide layer 2 according to the first embodiment described above except that no light-blocking area 24 is provided.

Planar Configuration of Display Layer and Light Guide Element

Figure 15:
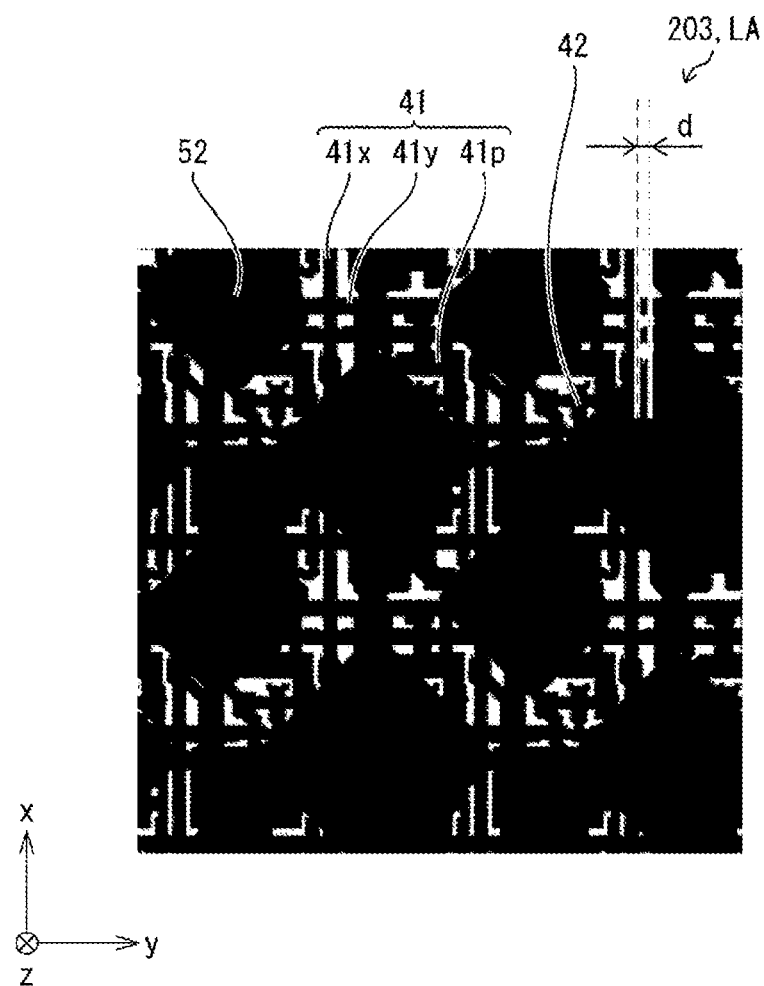
FIG. 15 is a partial plan view illustrating a first area in the display layer illustrated in FIG. 13.

FIG. 15 is a partial plan view illustrating the low-density area LA in the display layer 203 illustrated in FIG. 14. In FIG. 15, only the conductive layer 41, the semiconductor layer 42, and the pixel electrodes 52 are illustrated and other components are omitted to make it easier to understand the disclosure.

The conductive layer 41, the semiconductor layer 42, and the pixel electrodes 52 form a light-blocking pattern in the display layer 203 in a plan view taken from the z direction as illustrated in FIG. 15. Therefore, in order to reduce the influence of diffraction and interference, an opening diameter of the light guide elements 22 is preferably equal to or smaller than a wiring line interval d in a plan view taken from the z direction. The wiring line interval d is, for example, a minimum distance between the wiring lines 41x or a minimum distance between the wiring lines 41y.

Third Embodiment

Another embodiment of the disclosure will be described below. Further, members having the same functions as those of the members described in the above-described embodiments will be denoted by the same reference numerals and signs, and the description thereof will not be repeated for the sake of convenience of description.

Figure 16:
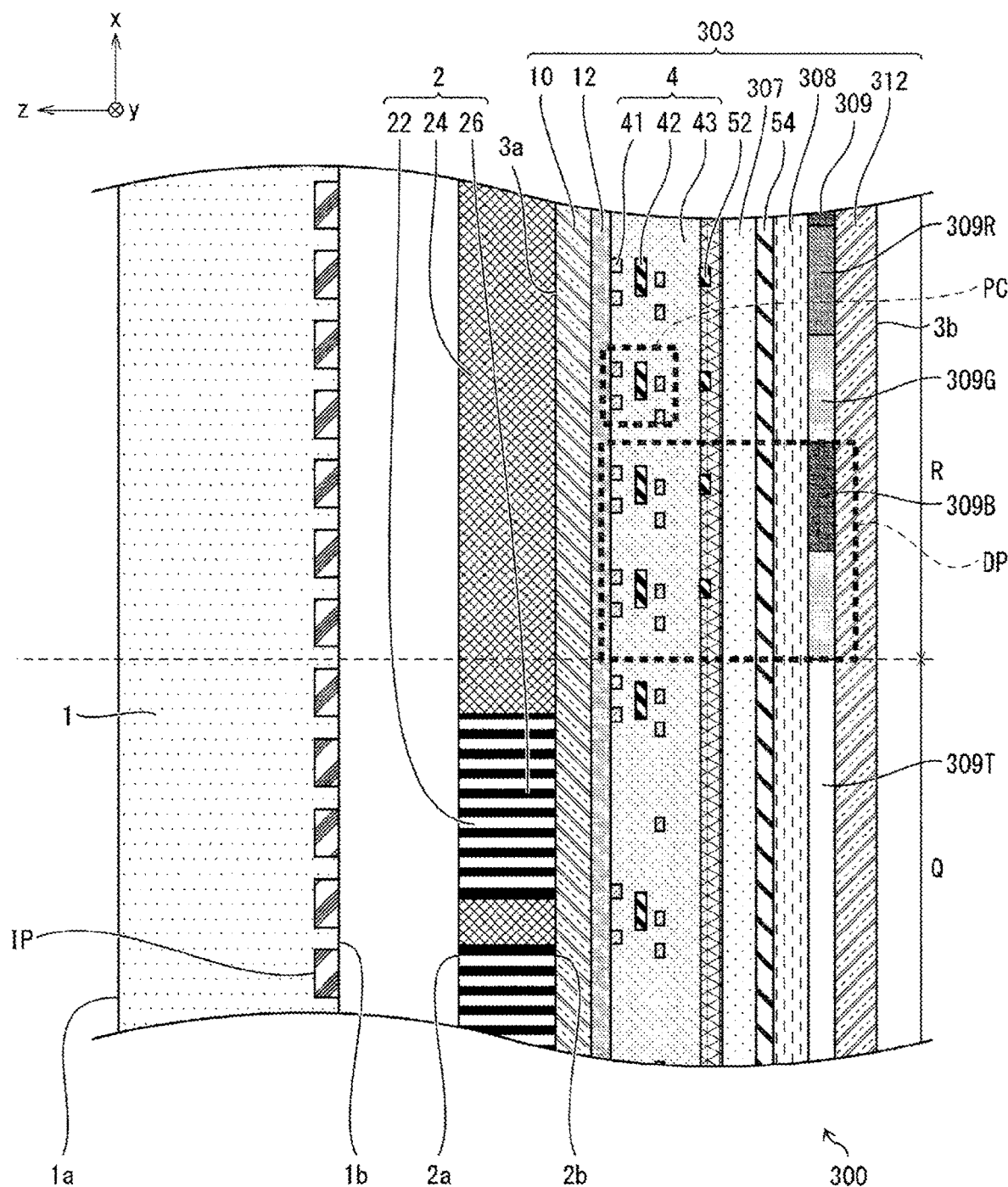
FIG. 16 is a partial cross-sectional view illustrating an example of a schematic configuration of a display device according to another embodiment of the disclosure.

FIG. 16 is a partial cross-sectional view illustrating an example of a schematic configuration of a display device 300 according to a third embodiment of the disclosure.

The display device 300 includes the imaging layer 1, the light guide layer 2, and a display layer 303 as illustrated in FIG. 16.

The display layer 303 according to the present embodiment includes, for example, a support substrate 310, the thin film transistor layer 4, the pixel electrodes 52, an alignment film 306, a liquid crystal layer 307, the common electrode 54, a polarizing layer 308, a color filter 309, and a counter substrate 312 in this order from the lower surface 3a to the upper surface 3b.

The pixel circuits PC are connected to the corresponding pixel electrodes 52 and control the potential of the connected pixel electrodes 52. The alignment of liquid crystals positioned above each electrode is responsive to an electrical field between each pixel electrode 52 and the common electrode 54. Thus, the pixel circuits PC control the alignment of the liquid crystals positioned above the corresponding pixel electrode 52.

Each of the support substrate 310 and the counter substrate 312 is a transparent substrate that transmits light and a rigid non-flexible substrate. The support substrate 310 and the counter substrate 312 are, for example, glass substrates or quartz substrates.

The alignment film 306 is a transparent layer that transmits light, and aligns the liquid crystals included in the liquid crystal layer 307. The alignment film 306 may be an organic alignment film obtained by subjecting an organic film to a rubbing treatment, or may be an inorganic alignment film.

The liquid crystal layer 307 contains liquid crystals and is sealed between the support substrate 310 and the counter substrate 312. The liquid crystal layer 307 may include a spacer (not illustrated).

The polarizing layer 308 transmits light in a specific polarization state. The polarizing layer 308 may have any configuration known as a polarizer or a polarizing film, for example.

The color filter 309 may have any configuration known as a color filter. The color filter 309 includes, for example, a red-light transmitting portion 309R that transmits only red light, a green-light transmitting portion 309G that transmits only green light, and a blue-light transmitting portion 309B that transmits only blue light. The "red light" refers to, for example, light in a wavelength band of greater than 600 nm and equal to or less than 780 nm. In addition, the "green light" refers to, for example, light in a wavelength band of greater than 500 nm and equal to or less than 600 nm. In addition, the "blue light" refers to, for example, light in a wavelength band equal to or greater than 400 nm and equal to or less than 500 nm.

The color filter 309 preferably further includes a transparent area 309T arranged to overlap the opening area Q. Alternatively, although not illustrated, the color filter 309 also preferably includes the red-light transmitting portions 309R, the green-light transmitting portions 309G, and the blue-light transmitting portions 309B to correspond to the arrangement of red, green, and blue imaging pixels IP in an area corresponding to the opening area Q.

The display layer 303 according to the present embodiment is not limited to the configuration illustrated in FIG. 16, and may have any known configuration as a reflective liquid crystal display. For example, the display layer 303 may have a configuration in which the common electrode 54 is positioned on the same side as the pixel electrodes 52 with respect to the liquid crystal layer 307. That is, the display layer 303 may be of a so-called In-Plane-Switching type or an Advanced Fringe-Field-Switching type.

Modified Example

The configuration of the display device 300 according to the present embodiment may be combined with the configuration of the display device 200 according to the second embodiment described above.

Specifically, the display layer 303 according to the present embodiment may be configured such that the density of the display pixels DP in the low-density area LA is equal to the density of the display pixels DP in the high-density area HA, similarly to the display layer 203 according to the second embodiment described above. In this case, the display device 300 according to the present embodiment includes the light guide layer 202 according to the above-described second embodiment, instead of the light guide layer 2 according to the above-described first embodiment.

The display device 300 according to the present embodiment may not include the color filter 309.

The disclosure is not limited to each of the embodiments described above, various modifications may be made within the scope of the claims, and embodiments obtained by appropriately combining technical approaches disclosed in each of the different embodiments also fall within the technical scope of the disclosure. Furthermore, novel technical features can be formed by combining the technical approaches disclosed in each of the embodiments.

The invention claimed is:

1. A display device comprising:
a first layer including an imaging element;
a second layer positioned as a layer above the first layer, the second layer including a light guide element configured to guide light incident from above to the imaging element located below; and
a third layer positioned as a layer above the second layer, the third layer including a pixel electrode and a pixel circuit connected to the pixel electrode to control a potential of the pixel electrode,
wherein the third layer includes a first area and a second area,
in each of the first and second areas, a plurality of pixel circuits, including the pixel circuit, and a plurality of pixel electrodes, including the pixel electrode, are arranged,
a density of the plurality of pixel circuits in the first area is lower than a density of the plurality of pixel circuits in the second area,
the imaging element and the light guide element are arranged to overlap the first area in a plan view taken from above,
the light guide element is arranged at a position not overlapping the plurality of pixel circuits and the plurality of pixel electrodes in the first area in the plan view taken from the above,
a plurality of light guide elements, including the light guide element, is provided,
the second layer further includes a boundary portion that is arranged between the plurality of light guide elements, the boundary portion configured to absorb or reflect light incident from the plurality of light guide elements,
the second layer further includes a light-blocking area,
the light-blocking area is arranged at a position overlapping the plurality of pixel circuits and the plurality of pixel electrodes in the first area in the plan view taken from the above, and is configured to absorb or reflect light incident from above,
the light-blocking area is made from a light-blocking material absorbing or reflecting light,
the boundary portion is made from a transparent material having a higher refractive index than a refractive index of each of the plurality of light guide elements, and
the light-blocking area is formed by covering an upper surface of the transparent material with the light-blocking material.

2. The display device according to claim 1, wherein the pixel electrode is a reflective electrode configured to reflect light.

3. The display device according to claim 1, wherein the pixel circuit includes a wiring line or an electrode configured to reflect or absorb light.

4. The display device according to claim 1, wherein the third layer further includes a plurality of wiring lines configured to absorb or reflect light, and the boundary portion overlaps at least a part of the plurality of wiring lines in the first area.

5. The display device according to claim 4, wherein the boundary portion overlaps all of the plurality of wiring lines in the first area.

6. The display device according to claim 1, wherein an interval between two adjacent pixel circuits of the plurality of pixel circuits in the first area is 10 times larger than a diameter of each of the plurality of light guide elements arranged between the two adjacent pixel circuits in the plan view taken from the above.

7. The display device according to claim 1, wherein the light-blocking area is arranged at a position overlapping all of the plurality of pixel circuits and all of the plurality of pixel electrodes in the first area in the plan view taken from the above.

8. The display device according to claim 1, wherein the light-blocking area is further arranged at a position overlapping the second area in the plan view taken from the above.

9. The display device according to claim 1, wherein the boundary portion is further arranged between the light-blocking area and the plurality of light guide elements.

10. The display device according to claim 1, wherein a plurality of light-blocking areas, including the light-blocking area, is provided, and two or more of the plurality of light guide elements are provided between two adjacent light-blocking areas of the plurality of light-blocking areas.

11. The display device according to claim 1, wherein the light-blocking area is arrayed in a same array pattern as an array pattern of the plurality of pixel circuits.

* * * * *